(12) United States Patent
Fluhrer et al.

(10) Patent No.: US 9,640,970 B2
(45) Date of Patent: May 2, 2017

(54) OVER-VOLTAGE PROTECTION DEVICE HAVING A COIL ASSEMBLY

(75) Inventors: Christoph Fluhrer, Neuried (DE); Thomas Gutsche, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 636 days.

(21) Appl. No.: 14/236,985

(22) PCT Filed: Jul. 4, 2012

(86) PCT No.: PCT/EP2012/063047
§ 371 (c)(1),
(2), (4) Date: Apr. 24, 2014

(87) PCT Pub. No.: WO2013/017366
PCT Pub. Date: Feb. 7, 2013

(65) Prior Publication Data
US 2014/0226249 A1     Aug. 14, 2014

(30) Foreign Application Priority Data
Aug. 4, 2011   (DE) .................. 10 2011 080 411

(51) Int. Cl.
*H02H 9/00* (2006.01)
*H02H 1/04* (2006.01)
*H01Q 1/50* (2006.01)

(52) U.S. Cl.
CPC ............... *H02H 1/04* (2013.01); *H01Q 1/50* (2013.01)

(58) Field of Classification Search
CPC ...................................... H02H 1/04

USPC ......................................... 361/118
See application file for complete search history.

(56) References Cited

U.S. PATENT DOCUMENTS

| | | | |
|---|---|---|---|
| 6,570,472 B1 * | 5/2003 | Niiranen ............... | H01P 1/2039 333/203 |
| 6,600,399 B1 | 7/2003 | Trandafir | |
| 7,446,633 B2 | 11/2008 | Yagisawa | |
| 8,384,484 B2 * | 2/2013 | Winslow ................ | H03F 1/565 330/195 |
| 2007/0164843 A1 | 7/2007 | Yagisawa et al. | |
| 2008/0042785 A1 | 2/2008 | Yagisawa | |

FOREIGN PATENT DOCUMENTS

| | | |
|---|---|---|
| EP | 0 443 173 A1 | 8/1991 |
| EP | 1 333 454 A1 | 8/2003 |

OTHER PUBLICATIONS

International Search Report issued in corresponding application No. PCT/EP2012/063047 mailed Feb. 4, 2013.

* cited by examiner

*Primary Examiner* — Stephen W Jackson
(74) *Attorney, Agent, or Firm* — Carter, DeLuca, Farrell & Schmidt, LLP (57) ABSTRACT

The present disclosure relates to an overvoltage-protection device for protecting a high-frequency terminal from overvoltage. Overvoltages can be compensated by a coil arrangement, which includes coils electrically in series with different, increasing inductances. The end of the relatively thinner coil is connected to the high-frequency terminal of a circuit.

18 Claims, 7 Drawing Sheets

Fig. 1: State of the art

OVER-VOLTAGE PROTECTION DEVICE HAVING A COIL ASSEMBLY

The invention relates to a device for protecting a high-frequency terminal from overvoltage.

High-frequency terminals are protected from overvoltages, such as can occur, for example, as a result of lightning, by providing all inputs and outputs of an amplifier with protection elements. In EP 1 333 454 A1, a coil comprising an electrically conductive wire is used for this purpose. A coarse protection is explained in conjunction with a fine protection. This is achieved in that the coil provides a part tapering in the direction towards an end of the coil connected to the high-frequency terminal.

The disadvantage with the coil from EP 1 333 454 A1 is that it must be manufactured using a complex method, because wire must be wound onto a template. The template comprises a cylinder and a pin, which is attached to a head end of the cylinder. This is costly since only small or medium production runs can generally be manufactured because an electrically conductive wire must be wound onto the cylinder and the pin in a complicated, special manufacturing process.

The object of the invention is therefore to provide an overvoltage device which can be manufactured in a cost-favourable manner and realised as far as possible with standard components.

The object is achieved by the overvoltage device according to the invention as specified in claim 1. Advantageous further developments of the overvoltage-protection device according to the invention are specified in the dependent claims.

A coil arrangement according to the invention, which is made up from two or more separate coils in the signal path from the high-frequency terminal to the ground potential with different, increasing inductances, is used in order to protect a circuit, for example, an amplifier, from overvoltages which could damage the components of the amplifier, for example, during a lightning strike. The coils in the signal path are electrically connected in series.

The increasing inductances are preferably realised in that the cross-sections of the individual coils directly adjacent to one another or directly contacted with one another in the signal path increase but remain constant within one coil, so that the cross-sectional areas of the coils with the relatively lower inductance is accordingly smaller than or equal to the cross-sectional areas of the directly contacted or directly adjacent coils with a relatively larger inductance.

As a result of the different cross-sectional areas of the coils, the resonant frequency of the coil with the relatively smaller cross-sectional area is increased because of the associated reduction of the parasitic capacitances of the coil. The operating range of the overvoltage-protection device provided in this manner is extended in the direction towards higher frequencies by comparison with a single coil with constant inductance or cross-sectional area. As a result of the coil with a relatively larger inductance or respectively cross-sectional area, a sufficiently high inductance is secured even for low frequencies, and accordingly, the blind resistance of the coil is disposed significantly above the rated impedance of the high-frequency terminal (generally 50 ohms). As a result of the high inductance of the coil achieved in this manner, the overall structural length of the coil can be kept small, so that installation within restricted spatial dimensions is also possible. Improved properties are achieved with regard to the individual resonant frequencies by comparison with the conical end disclosed in EP 1 333 454 A1.

Advantageous further developments of the overvoltage device according to the invention can be achieved with the measures specified in the dependent claims.

Exemplary embodiments of the overvoltage-protection device according to the invention are presented by way of example in the drawings and explained in greater detail with reference to the following description. The drawings show.

Parts which correspond with one another are shown with the same reference numbers in all of the drawings. In particular, the reference numbers in FIG. 1, which relate to the prior art, are shown in agreement with the exemplary embodiments according to the invention.

Figure 1:
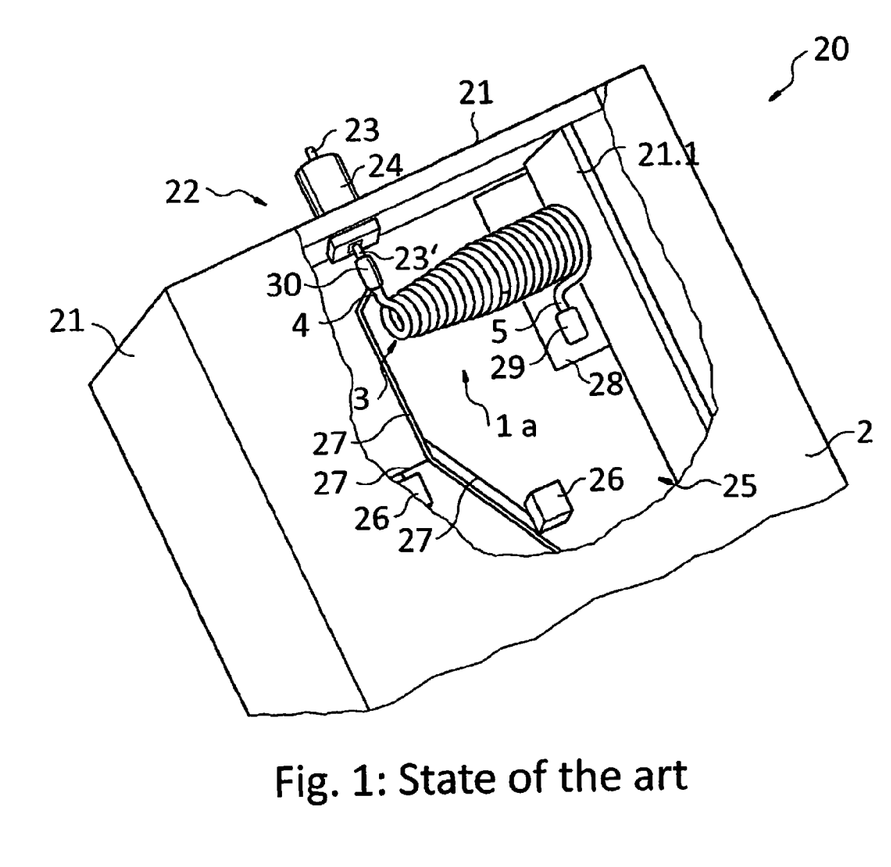
FIG. 1 the prior art with one coil which tapers in a conical manner at one end.

FIG. 1 shows, as the prior art, an overvoltage-protection device for protecting a high-frequency terminal 22 from overvoltage. The high-frequency terminal 22 comprises a through-connected contact 23 and an electromagnetic shield 24. The actual conduction of the signal takes place through the contact 23, which is connected through the interior of the housing 21 and is referred to there as the through-connected contact 23'. The coil 1a is wound from an electric wire. The second connecting element 5 of the coil 1a is contacted to a ground potential 28. In the direction of a coil axis, the coil 1a provides a part 3 tapering in the direction towards an end of the coil connected to the through-connected contact 23' of the high-frequency terminal 22. The tapering ends at the first connecting element 4, which is connected to the through-connected contact 23' of the high-frequency terminal 22 of a circuit 20 via a soldered connection 30. The components 26 of the circuit 20 are contacted via a high-frequency conductor 27. The overvoltage-protection device is electromagnetically insulated via a metallic housing 21 and a dividing wall 21.1.

Figure 2:
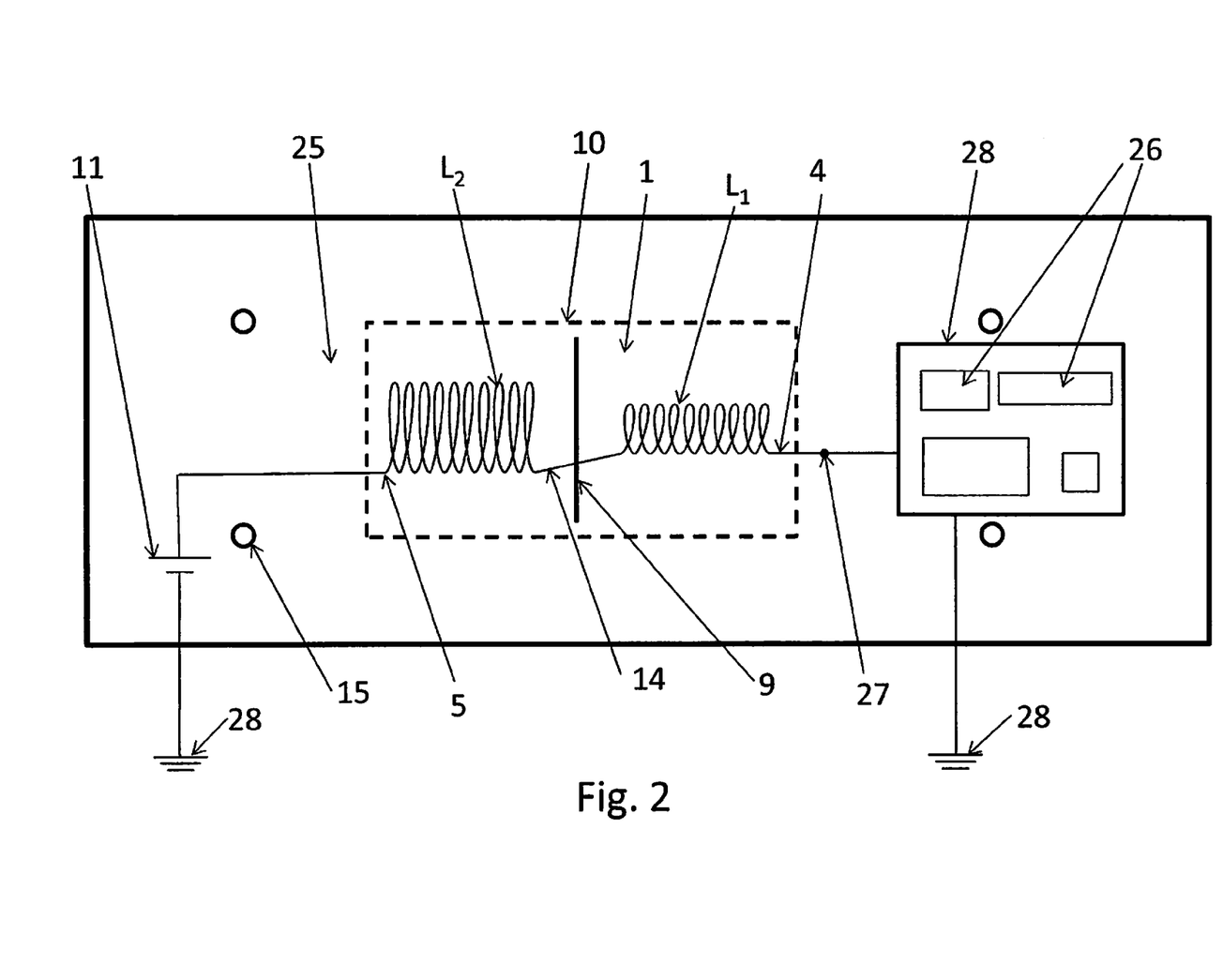
FIG. 2 a plan view of a first exemplary embodiment of an overvoltage-protection device according to the invention with a coil arrangement which is made from two separate coils.

By contrast, in the exemplary embodiment shown in FIG. 2, the overvoltage-protection device according to the invention for protecting a high-frequency terminal 22 from overvoltage provides a coil arrangement 1 which comprises two or more cylindrical coils in series with n different, cross-sectional areas $A_1, A_2, \ldots, A_n$ increasing in size, or respectively, in the case of circular cross-sections, with increasing diameters $d_1, d_2, \ldots, d_n$. In this context, n denotes the number of coils. The coil end with the smallest cross-sectional area $A_1$ is connected to the high-frequency terminal 22 shown in FIG. 3 via a first connecting element 4. A second connecting element 5 for the coil end with the largest cross-sectional area $A_n$ is connected either directly or via a current source or voltage source 11 to a ground potential 28. In general, this is a direct voltage (DC) source.

FIG. 2 shows the plan view of the first exemplary embodiment of a device according to the invention for protecting the circuit 20. The structure according to the invention is surrounded by a metallic housing 21. This provides electromagnetic shielding. The coil arrangement 1 guides the through-connected contact 23' of the high-frequency terminal 22 to the current or voltage supply 11. The circuit 20 to be protected or the components 26 to be protected are contacted both to the high-frequency terminal 22 and also to ground potential 28. The printed-circuit board 25 is metallised over its full area. Only a rectangular cut-out 10 in the metallisation 16 is provided under the coil arrangement 1 or respectively under each of the coils $L_1, L_2, \ldots, L_n$.

Figure 3:
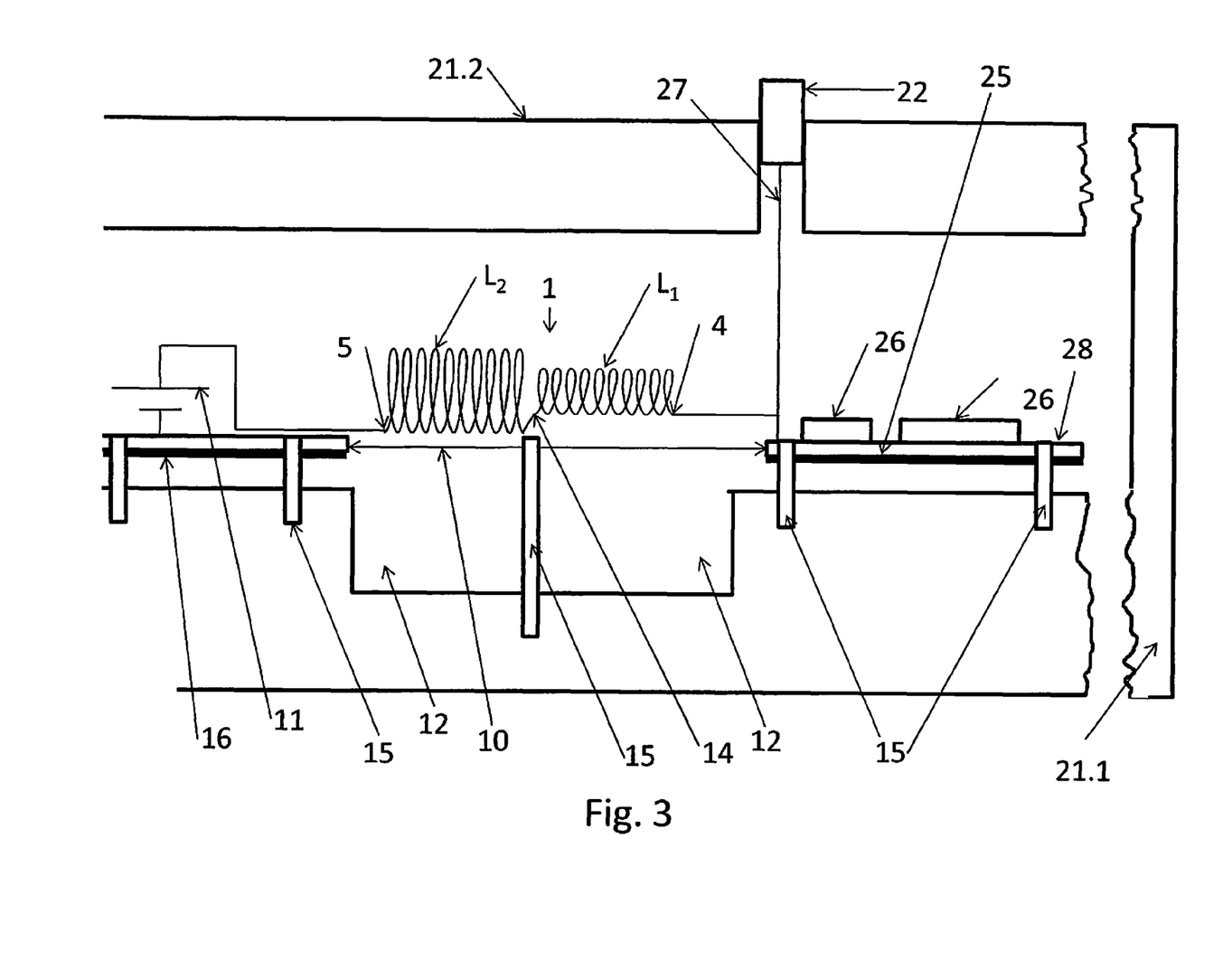
FIG. 3 a cross-section of the first exemplary embodiment according to the invention with a coil arrangement which is made from two coils.

FIG. 3 illustrates a cross-section through the exemplary embodiment of the overvoltage-protection device already explained in FIG. 2. The high-frequency terminal 22 is additionally shown. This is guided to the circuit 20 from above. The circuit 20, the coil arrangement 1 and the current or voltage source 11 are disposed on the printed-circuit board 25, which is attached to the housing 21 with support elements 15. A cut-out 12 in the metallic housing 21, which can be manufactured, for example, by milling or with an appropriately shaped die, is disposed directly under the coil arrangement 1. The additional hollow cavity or spacing of the cut-out 12 saves weight and achieves a considerable reduction of parasitic capacitances. The two coils $L_1$, $L_2$, which form the coil arrangement 1 are electromechanically connected to one another by a length of wire 14.

The coil arrangement 1 is advantageously made up from a first coil $L_1$ and a second coil $L_2$, comprising separate coils, which are electromechanically connected to one another, especially by a soldered connection. The ends of the individual coils $L_1$, $L_2$ are preferably embodied as contact points and can be connected to one another. However, other connections, such as plug connections, welding, twisting or biscuit connectors are also conceivable. The same applies for the further coils $L_1, L_2, \ldots, L_n$ electromechanically contacted or directly connected to one another. In this manner, standard components can be used for the manufacture of the coils 1, so that the costly process of winding a wire onto a template can be dispensed with according to the invention.

Figure 4:
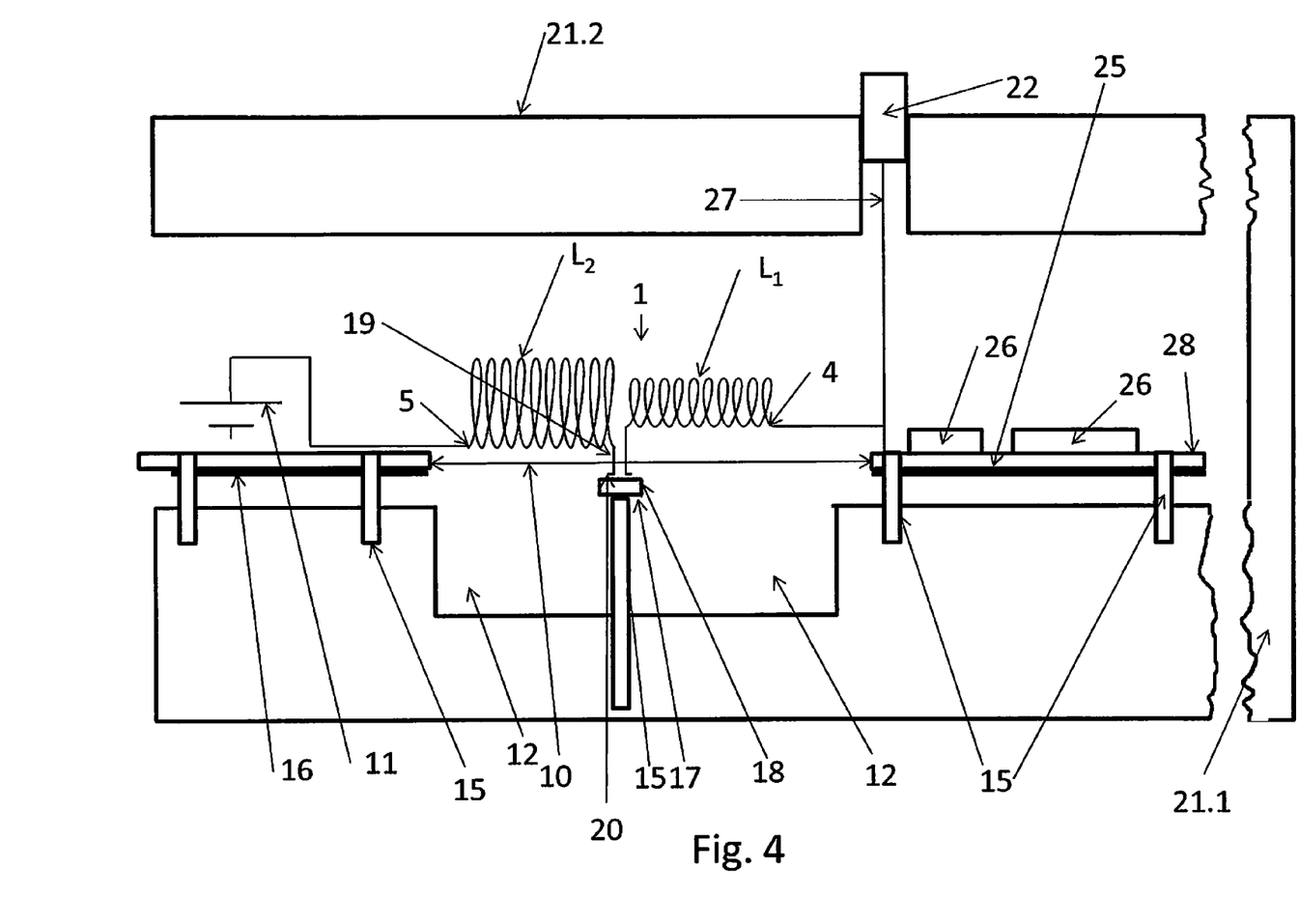
FIG. 4 a cross-section of a second exemplary embodiment according to the invention with a coil arrangement which comprises two coils which are connected to a solder pad.

The exemplary embodiment illustrated in FIG. 4 differs from FIG. 3 in that the connection of the two coils L1, L2 is not provided through a connection with a simple length of wire, but the projecting legs 19 of the coils $L_1$, $L_2$ are attached to a solder pad 18 preferably by reflow soldering, that is, the electromechanical connection of the separate coils $L_1, L_2, \ldots, L_n$ is achieved with solder pads 18 which are contacted with legs 19 of the coils $L_1, L_2, \ldots, L_n$. On its rear side, the solder pad 18 also provides a metallisation 17 which is contacted to the ground potential 28.

The ends of the individual coils $L_1$, $L_2$ are preferably embodied as contact points and can therefore simply be electromechanically connected to a solder pad 18 or a printed circuit board 25. The legs 19 can be optimised for reflow soldering. For example, the shape of the legs 20 can be adapted by means of pressing tools. Accordingly, the coil 1 according to the invention can be manufactured simply, rapidly and in a cost favourable manner in medium to large production runs.

In a further embodiment, the leads h between the individual coil portions differ, so that both the inductance and also the capacitance of the individual coil portions vary. In particular, the inductance L is varied in that, in equation 1, the number of windings N progresses in a quadratic manner, while the lead h between the individual windings in equation 2, determines the capacitance C in a reciprocal manner. A is the cross-sectional area, $\mu$ is the permeability and $\epsilon$ is the dielectric constant $$L = \mu * N^2 / 1 * A \tag{1}$$

$$C = \epsilon * A / h \tag{2}$$

The frequency range which can be covered by the coil arrangement 1 can be further increased in that the wire diameter of the second coil $L_2$ is larger than the wire diameter of the first coil $L_1$, or respectively, in that the wire diameter increases or at least remains constant with an increasing cross-sectional area $A_1, A_2, \ldots, A_n$ or inductance of the individual coils $L_1, L_2, \ldots, L_n$, so that the wire diameter of the coils $L_1, L_2, \ldots, L_n$ with relatively lower inductance is smaller than or equal to the wire diameter of the coil with the relatively larger inductance $L_1, L_2, \ldots, L_n$ directly electrically contacted or directly adjacent to the named coil $L_1, L_2, \ldots, L_n$.

This has the advantage that the capacitance between the individual windings in the signal path from the high-frequency terminal 22 to the ground potential 28 of the observed coil $L_k$ is smaller than the capacitance between the windings of the directly following coil $L_{k+1}$ in each case. In this context, k is a natural number with values from 1 to n−1. As a result of the associated, relatively lower parasitic capacitance of the observed front coil $L_k$, the resonant frequency is increased, so that the operating range of the overvoltage-protection device is accordingly additionally extended towards relatively higher frequencies. This effect cannot be achieved in technical production with a single conical coil, because this would then necessitate different wire thicknesses along its length, so that it could be wound onto a template.

The electrically conductive wire preferably comprises lacquered copper wire with a cross-sectional area of 0.1-1 mm$^2$. The cross-sectional area of the wire determines the maximum current, which can be drained, for example, in the event of a lightning strike. In one advantageous embodiment, the individual windings of the coil arrangement 1 are wound tightly together.

Figure 6:
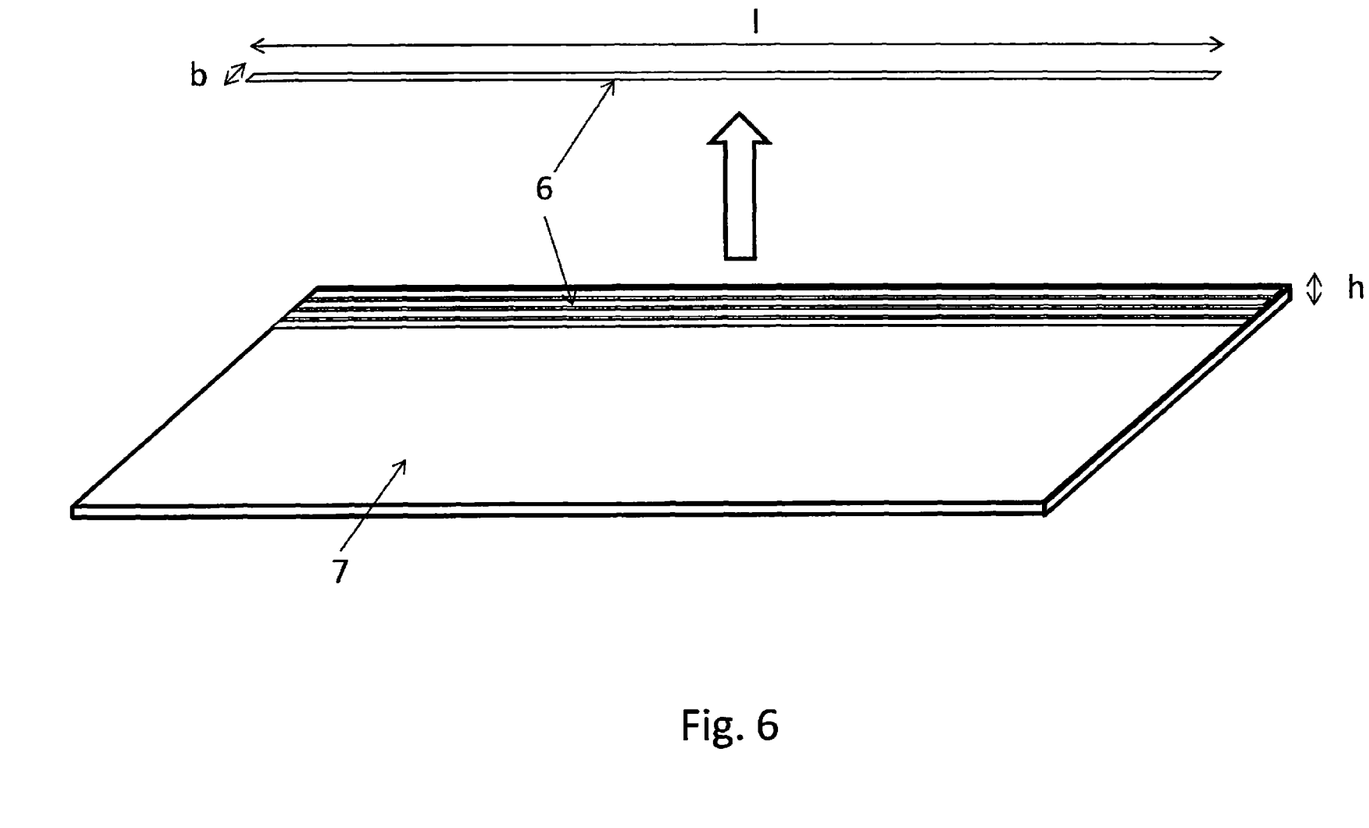
FIG. 6 a manufacturing method for a fourth exemplary embodiment according to the invention made from a metal sheet.

In a further embodiment of the invention, as shown in FIG. 6, coils can be manufactured by separating extremely elongated rectangles 6 of length l, width b and thickness h from a thin sheet 7 preferably made of metal, for example, by cutting, especially with a laser, or by punching.

Figure 7A:
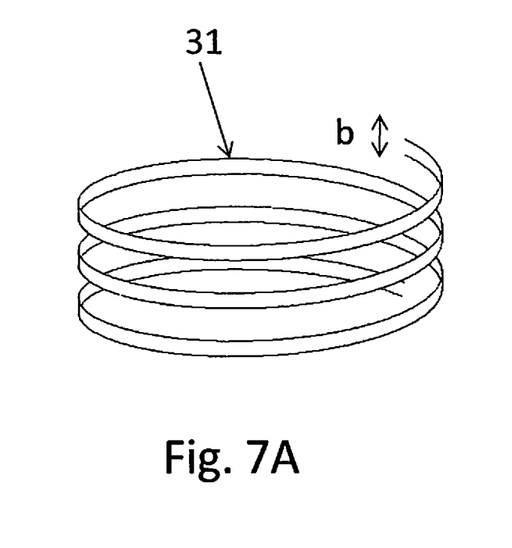
FIG. 7A a coil winding made from a metal sheet of the fourth exemplary embodiment with an arrangement of the metal strip in the longitudinal direction and FIG. 7B a coil winding made from a metal sheet of the fourth exemplary embodiment with an arrangement of the metal strip in the radial direction.

In an embodiment illustrated in FIG. 7A, coils $L_1$, $L_2, \ldots, L_n$ of low capacitance, that is, with a high resonant frequency, are wound in such a manner that the thickness d determines the capacitance between the individual windings of the coils $L_1, L_2, \ldots, L_n$. By preference, the coils $L_1$, $L_2, \ldots, L_n$ of this design of the perpendicular type 31, as illustrated in FIG. 7A, also provide a small cross-sectional area $A_1, A_2, \ldots, A_n$. With this design, the relatively narrower surfaces, which correspond to the thickness of the metal sheet and are not illustrated in FIG. 7A and FIG. 7B, are disposed opposite to one another.

Figure 7B:
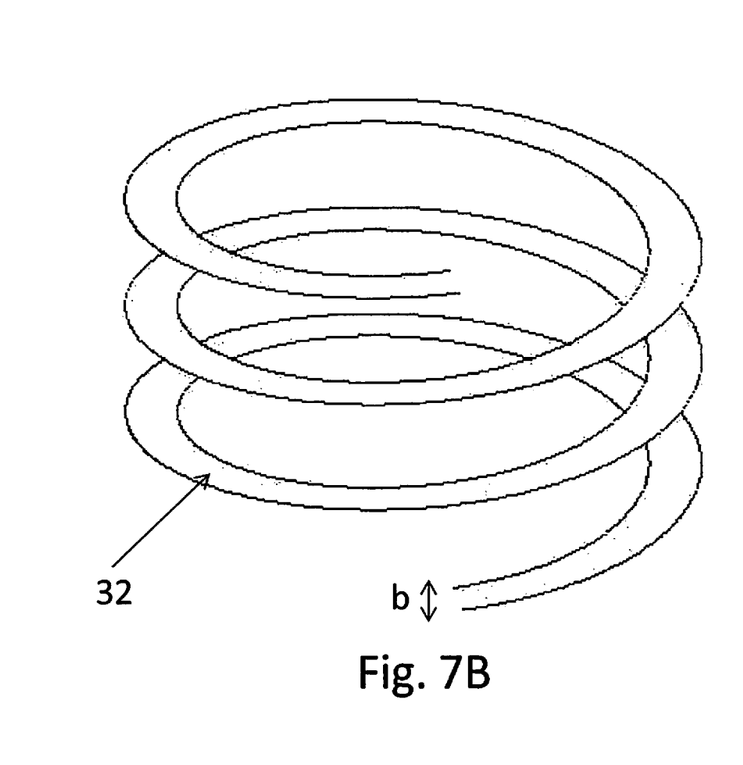

In a further design illustrated in FIG. 7B of the flat type 32, coils $L_1, L_2, \ldots, L_n$ with a high capacitance with an approximately identical inductance by comparison with FIG. 7A, that is, of low resonant frequency, are wound in such a manner that the width b determines the capacitance between the individual windings of the coils $L_1, L_2, \ldots, L_n$. With the shape of the coil of the flat type 32, the relatively larger surfaces are disposed opposite to one another. In this manner, the maximum possible current in all coils $L_1, L_2, \ldots, L_n$ of the coil arrangement 1 can be of the same magnitude, but a further degree of freedom is obtained for adjusting the inductance or respectively the capacitance of the individual coils $L_1, L_2, \ldots, L_n$. In particular, the resonant frequency can be reduced, if the capacitance between the windings of a coil $L_1, L_2, \ldots, L_n$ is increased by positioning the flat sides of the windings with a small spacing distance from one another.

If the flat sides are positioned facing radially outwards, that is, so that the normal of the flat side faces radially outwards, ideally with a large spacing distance from the coil windings, a very high resonant frequency is obtained, because the coils $L_1, L_2, \ldots, L_n$ provides a low capacitance and inductance.

FIG. 6 and FIGS. 7A and 7B are not shown to scale for reasons of improved visual orientation. However, the ratio $1 \gg b > 3h$ applies, and the cross-sectional area of the current-conducting, metallic strip 6 wound into a coil $L_1, L_2, \ldots, L_n$ should be constant in the case of coils $L_1, L_2, \ldots, L_n$ in a coil arrangement 1.

It is advantageous that the ratio of the inductances of the first coil $L_1$ relative to the second coil $L_2$ or respectively two coils $L_1, L_2$ directly electrically contacted or directly adjacent to one another is disposed between 4 to 1 and 16 to 1, preferably at approximately 8 to 1. The diameters of the second and the first coil $L_2, L_1$ provide a ratio between 1.5 to 1 and 3 to 1, particularly advantageously a ratio from 2 to 1. Typical diameters of the first round coil $L_1$ are disposed between 1 mm and 4 mm, especially 2 mm. Typical diameters of the second round coil $L_2$ are disposed between 1 mm and 4 mm, especially 2 mm. The diameter of the first coil $L_1$ should advantageously be smaller than the diameter of the second coil $L_2$.

Further possible embodiments are formed by coils with rectangular or oval cross-section instead of circular.

The corresponding cross-sectional areas $A_1, A_2$ for round coils can be determined with reference to equation 3, in which A denotes the cross-sectional area and d denotes the diameter.

$$A = \pi * (d/2)^2 \quad (3)$$

Accordingly, a corresponding cross-sectional area $A_1$ of the first coil $L_1$ between 0.78 mm² and 12.57 mm², especially 3.14 mm² is obtained. The corresponding cross-sectional area $A_2$ of the second coil $L_2$ is between 3.14 mm² and 28.27 mm², especially 12.56 mm². In general, the lengths of the individual coils with different diameter or respectively different cross-sectional area are approximately identical.

The overvoltage device is conventionally disposed on a printed circuit board 25 metallised over its entire surface, which is contacted to ground potential 28. Parasitic capacitances between the coils $L_1, L_2, \ldots, L_n$ and the printed-circuit board 25 can be significantly reduced through cut-outs 10 in the metallisation 16 of the printed circuit board 25, especially rectangular cut-outs under the coils $L_1, L_2, \ldots, L_n$.

Accordingto the invention, the coil arrangement 1 is preferably implemented as an air coil. An air coil provides the advantage of a low mass. However, especially in the case of different leads h, it is advantageous to provide coil portions with a soft-magnetic core, so that each coil portion $L_1, L_2, \ldots, L_n$ can be optimised individually, without influencing the other coil portions $L_1, L_2, \ldots, L_n$ via stray fields or influencing the coil portion $L_1, L_2, \ldots, L_n$. It may also be advantageous to provide only certain coil portions $L_1, L_2, \ldots, L_n$ with a magnetic core.

Figure 5:
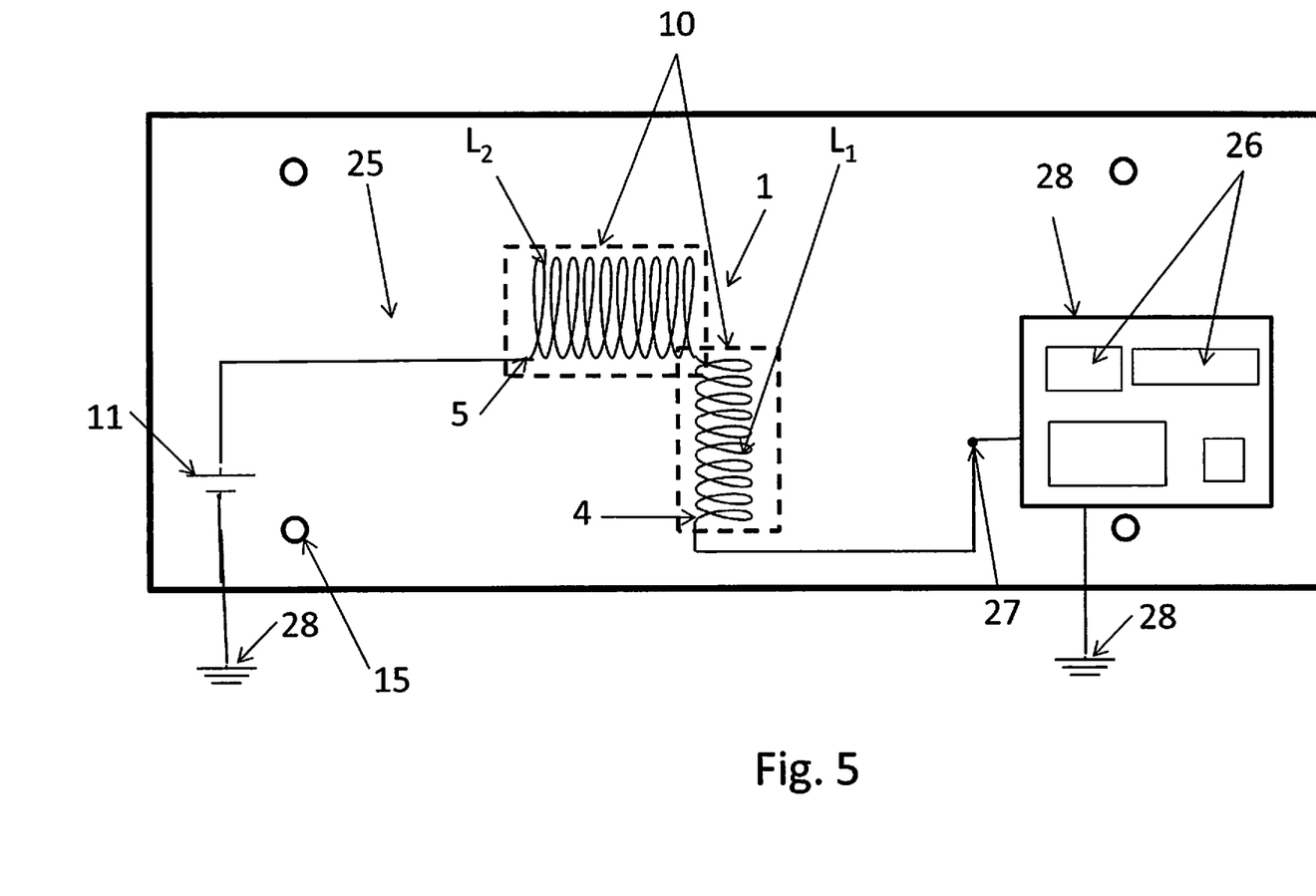
FIG. 5 a plan view of a third exemplary embodiment according to the invention with a coil arrangement which is made from two separate coils which are largely magnetically decoupled.

As an alternative, in a further embodiment, a decoupling of the individual coil portions $L_1, L_2, \ldots, L_n$ can be largely achieved, as shown in FIG. 5, in that the directly, electromechanically contacted or adjacent coil portions are orientated in different directions relative to one another, preferably orthogonally. Accordingly, the magnetic fields of the individual coil portions $L_1, L_2, \ldots, L_n$ hardly influence one another. However, coil portions $L_1, L_2, \ldots, L_n$ not directly adjacent or not directly contacted can also be arranged with a parallel orientation, provided the coil portions $L_1, L_2, \ldots, L_n$ are disposed with an adequate geometric spacing distance from one another, for example, approximately 5 mm. The cut-outs 10 in the metallisation 16 under the individual coils $L_1, L_2, \ldots, L_n$ are advantageously rectangular and can overlap as illustrated in FIG. 5.

A further alternative for the electromagnetic decoupling of the coils $L_1, L_2, \ldots, L_n$ is to attach, in each case between the individual, especially the directly electrically contacted or mutually, directly adjacent coils $L_1, L_2, \ldots, L_n$, a metallic, ideally non-magnetisable, electrically conductive plate 9, which is electrically connected to ground potential 28, as illustrated in FIG. 2. The plate 9 can be attached with support elements 15 to the printed circuit board 25 or to the housing 21.

It is also advantageous, if the outer regions of the coil arrangement 1 are distanced, for example, by at least 3 mm from the housing 21 and/or from electrically conductive parts. This significantly reduces the influence of parasitic capacitances. The housing 21 is generally also connected to ground potential 28. However, in order to occupy as little volume as possible, the spacing distance should not be greater than 10 mm. A spacing distance of, for example, approximately 5 mm is therefore selected by preference.

According to the invention, all of the devices described can also be realised with more than two coils and combined with one another. All of the features described or illustrated can be combined with one another as required within the scope of the invention.

The invention claimed is:

1. An overvoltage-protection device for protecting a high-frequency terminal from overvoltage, comprising:
   a coil arrangement including several separate coils, which are electrically connected in series with different, increasing inductances,
   wherein a coil with the lowest inductance is connected electromechanically via a first connecting element to the high-frequency terminal, and a coil with the highest inductance is connected either directly via a second connecting element or via a current source or voltage source to a ground potential.

2. The overvoltage-protection device according to claim 1, wherein cross-sectional areas of the coils with relatively lower inductance is smaller than or equal to cross-sectional areas of directly adjacent or directly contacted coils with relatively larger inductance.

3. The overvoltage-protection device according to claim 1, wherein the coil arrangement includes several separate coils, which are connected electromechanically to one another in each case via a soldered connection.

4. The overvoltage-protection device according to claim 3, wherein the electromechanical connection of the separate coils is embodied through solder pads, which are contacted with legs of the coils.

5. The overvoltage-protection device according to claim 1, wherein a wire diameter of the coils with the relatively lower inductance is smaller than or equal to a wire diameter of the coil with the relatively larger inductance directly electrically contacted with or adjacent to the coils with the relatively lower inductance.

6. The overvoltage-protection device according to claim 5, wherein a ratio of the inductances of two coils directly electrically contacted with or directly adjacent to one another is between 4 to 1 and 16 to 1.

7. The overvoltage-protection device according to claim 1, wherein the overvoltage-protection device is disposed on a metallised printed circuit board.

8. The overvoltage-protection device according to claim 7, wherein a cut-out in the metallisation of the printed circuit board is disposed under the coils.

9. The overvoltage-protection device according to claim 1, wherein external dimensions of the coil arrangement are between 3 mm and 10 mm, away from a housing and/or from electrically conductive parts.

10. The overvoltage-protection device according to claim 5, wherein the coils directly electromechanically connected or directly adjacent to one another are arranged orthogonally relative to one another.

11. The overvoltage-protection device according to claim 10, wherein metallic and/or non-magnetisable but electrically conductive plates which are electrically connected to the ground potential are arranged between the coils directly electromechanically connected or directly adjacent to one another.

12. The overvoltage-protection device according to claim 2, wherein the cross-sectional area of the coils has a shape of a circle, a rectangle or an oval.

13. The overvoltage-protection device according to claim 2, wherein the cross-sectional area of the coil wire is rectangular and/or that the coils are manufactured by separating a long rectangle from a metal sheet.

14. The overvoltage-protection device according to claim 1, wherein the coils with low inductance are wound in such a manner that a thickness of a coil wire determines a capacitance between individual windings of the coils, in that relatively smaller surfaces of the coil wire face towards one another, and/or that coils with high inductance are wound in such a manner that a width of the coil wire determines a capacitance between individual windings of the coils, in that relatively larger surfaces of the coil wire face towards one another.

15. The overvoltage-protection device according to claim 5, wherein the ratio of the inductances of the two coils directly electrically contacted with or directly adjacent to one another is approximately 8 to 1.

16. The overvoltage-protection device according to claim 1, wherein the external dimensions of the coil arrangement are 5 mm away from a housing and/or from electrically conductive parts.

17. An overvoltage-protection device for protecting a high-frequency terminal from overvoltage, comprising:
   a coil arrangement including several separate coils, which are electrically connected in series with different, increasing inductances,
   wherein cross-sectional areas of the coils with relatively lower inductance is smaller than or equal to cross-sectional areas of directly adjacent or directly contacted coils with relatively larger inductance.

18. An overvoltage-protection device for protecting a high-frequency terminal from overvoltage, comprising:
   a coil arrangement including several separate coils, which are electrically connected in series with different, increasing inductances,
   wherein the overvoltage-protection device is disposed on a metallised printed circuit board.

* * * * *